(12) United States Patent
Triano et al.

(10) Patent No.: US 7,149,299 B2
(45) Date of Patent: Dec. 12, 2006

(54) SYSTEM AND METHOD FOR CALL COMPLETION ON BUSY SUBSCRIBERS

(75) Inventors: Manuel Cardeno Triano, Fuentes de León (ES); Jose Antonio Sanchez Cembellin, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 681 days.

(21) Appl. No.: 10/316,576

(22) Filed: Dec. 11, 2002

(65) Prior Publication Data

US 2003/0123474 A1 Jul. 3, 2003

(30) Foreign Application Priority Data

Dec. 28, 2001 (EP) ................................. 01205182

(51) Int. Cl.
H04M 3/42 (2006.01)
(52) U.S. Cl. .............................. 379/210.01; 455/414.1; 379/209.01
(58) Field of Classification Search ........... 379/220.01, 379/211.01, 210.01; 455/528
See application file for complete search history.

(56) References Cited

U.S. PATENT DOCUMENTS

| | | | | |
|---|---|---|---|---|
| 4,166,929 | A | * | 9/1979 | Sheinbein .............. 379/209.01 |
| 5,668,853 | A | * | 9/1997 | Florence et al. ........... 379/67.1 |
| 5,905,960 | A | * | 5/1999 | Nicholl et al. .............. 455/450 |
| 5,995,848 | A | * | 11/1999 | Nguyen ...................... 455/528 |
| 6,360,109 | B1 | * | 3/2002 | Thauvin et al. ............. 455/564 |
| 6,456,842 | B1 | * | 9/2002 | Subramanian et al. ... 455/414.3 |
| 6,625,141 | B1 | * | 9/2003 | Glitho et al. ................ 370/352 |
| 6,731,937 | B1 | * | 5/2004 | Spinner ...................... 455/445 |
| 6,975,596 | B1 | * | 12/2005 | Kaiser ........................ 370/254 |
| 2002/0075905 | A1 | * | 6/2002 | Goldstein ................... 370/522 |
| 2003/0063732 | A1 | * | 4/2003 | Mcknight .............. 379/210.01 |
| 2003/0123474 | A1 | * | 7/2003 | Triano et al. ............... 370/450 |
| 2004/0028204 | A1 | * | 2/2004 | Crook ................... 379/211.01 |

FOREIGN PATENT DOCUMENTS

WO    WO 00/79756    12/2000

(Continued)

OTHER PUBLICATIONS

Lennox J., Schulzrinne H., La Porta T.F.: "Implementing Intelligent Network Services with the Session Initiation Protocol"; Internet Article, Online!, Feb. 19999, XP002199311, Columbia University dept. of Computer Science; Retrieved from the Internet: <URL:www.cs.columbia.edu/{lennox/cucs-002-99.pdf>'retrieved on May 16, 2002'.

(Continued)

*Primary Examiner*—Wing Chan
*Assistant Examiner*—Aamir Haq
(74) *Attorney, Agent, or Firm*—Roger Burleigh

(57) ABSTRACT

System and methods for allowing the extension of the ISDN/GSM Call Completion to Busy Subscriber Supplementary Service across a Network Boundary between a general Switched Circuit Network (SCN) using ISUP as call control protocol, and an IP Packet Network using SIP as session control protocol. The methods define a set of new protocol elements to be included in the Session Initiation Protocol (SIP) in order to make it possible to implement the required service logic in SIP User Agents and Clients. The methods also define the set of sequences, timers and use cases that a Network Gateway must fulfil in order to allow users from both networks to invoke the service for calls going through the Network Gateway in question; the Network Gateway represents an end-point for both SCN and SIP domains.

14 Claims, 6 Drawing Sheets

FOREIGN PATENT DOCUMENTS

WO          WO 00/79756 A2    12/2000

OTHER PUBLICATIONS

Chatzipapadopoulos F., et al.: "Harmonised Internet and PSTN Service Provisioning"; Computer Communications, Elsevier Science Publishers BV, Amsterdam, NL, vol. 23, No. 8, Apr. 2000, pp. 731-739, XP004192593, ISSN: 0140-3664.

Hamdi M., et al.: "Voice Service Interworking for PSTN and IP Networks"; IEEE Communications Magazine, IEEE Service Center, Piscataway, N.J.; vol. 37, No. 5, May 1999, pp. 104-111, XP000830888; ISSN: 0163-6804.

Handly/Schulzrinne/Schooler/Rosenberg: "SIP: Session Initiation Protocol"; IETF Interent Draft, Nov. 24, 2000, XP002196891.

Lennox J., Schulzrinne H., La Porta T.F.: "Implementing Intelligent Network Services with the Session Initiation Protocol" Internet Article, 'Online! Feb. 1999 XP002199311 Columbia University dept. of Computer Science, Retrieved from the Internet: <URL: www.cs.columbia.edu/{lennox/cucs-002-99.pdf>.

Chatzipapadopoulos F et al: "Harmonised Internet and PSTN service provisioning" Computer Communications, Elsevier Science Publishers BV, Amsterdam, NL, vol. 23, No. 8, Apr. 2000, pp. 731-739, XP004192593, ISSN: 0140-3664.

Hamdi M et al: "Voice Service Interworking for PSTN and IP Networks" IEEE Communications Magazine, IEEE Service Center. Piscataway, N.J, US, vol. 37, No. 5, May 1999, pp. 104-111, XP000830888, ISSN: 0163-6804.

* cited by examiner

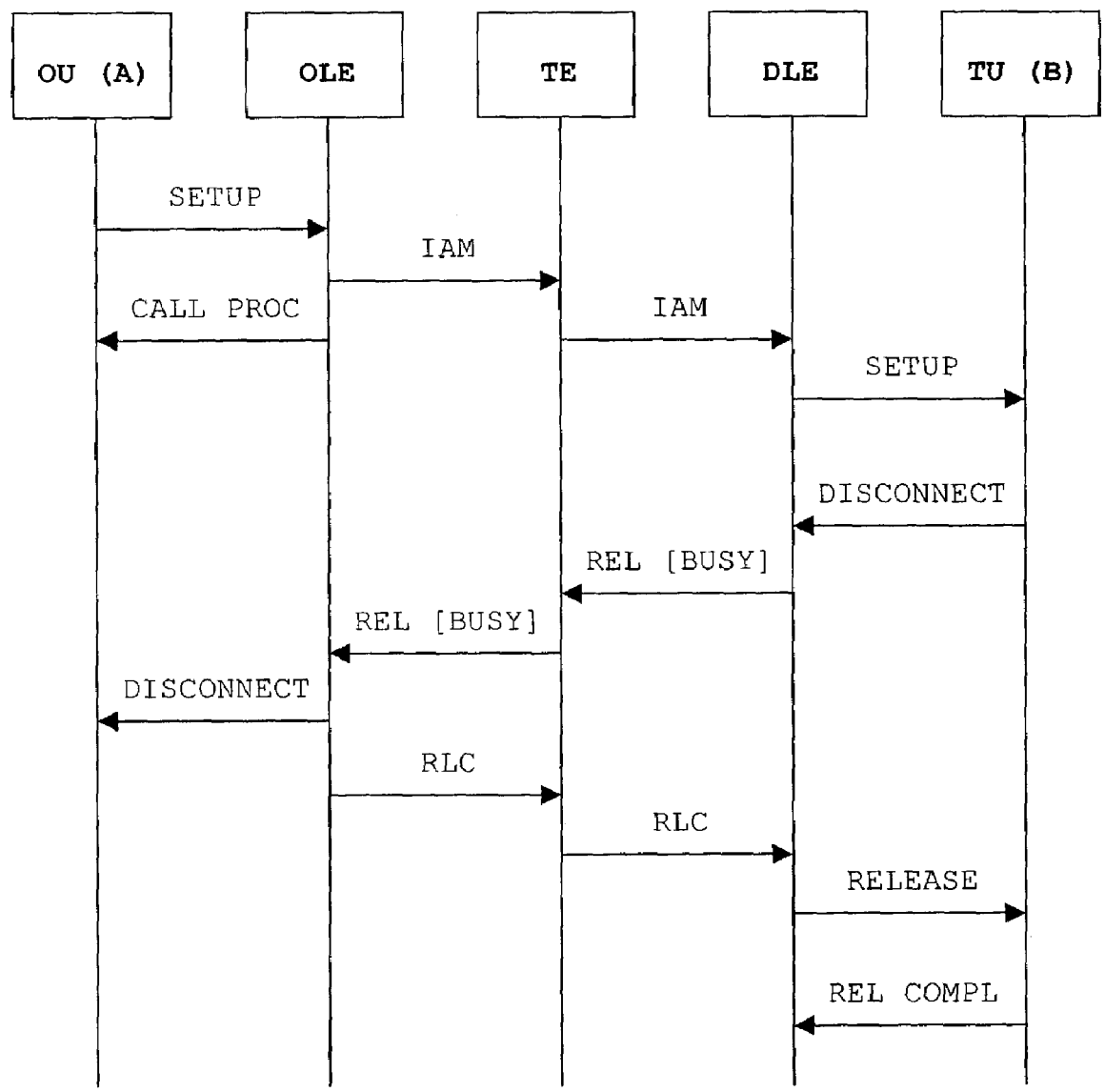
FIG.-1a-
Related art

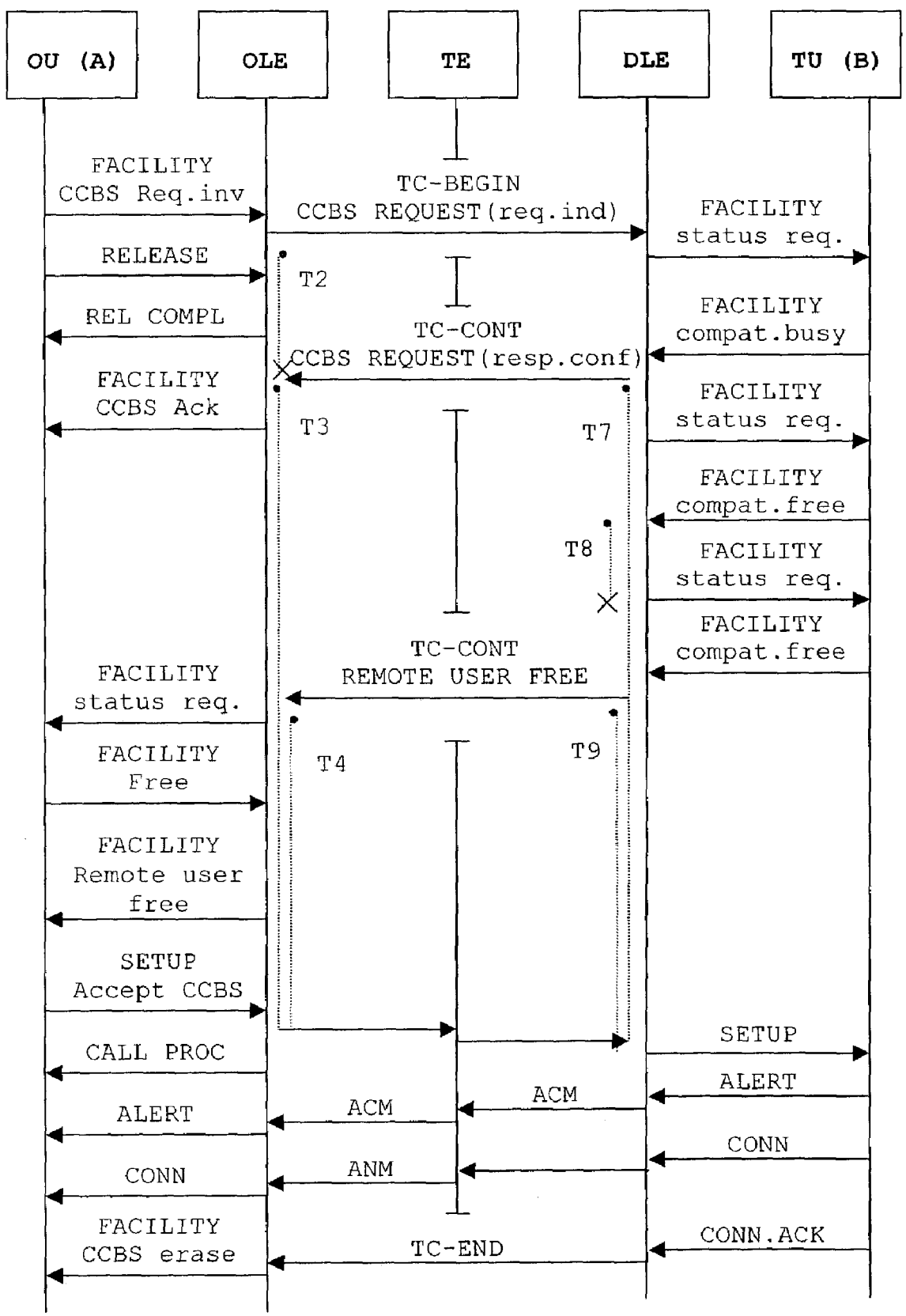
FIG.-1b-
Related art

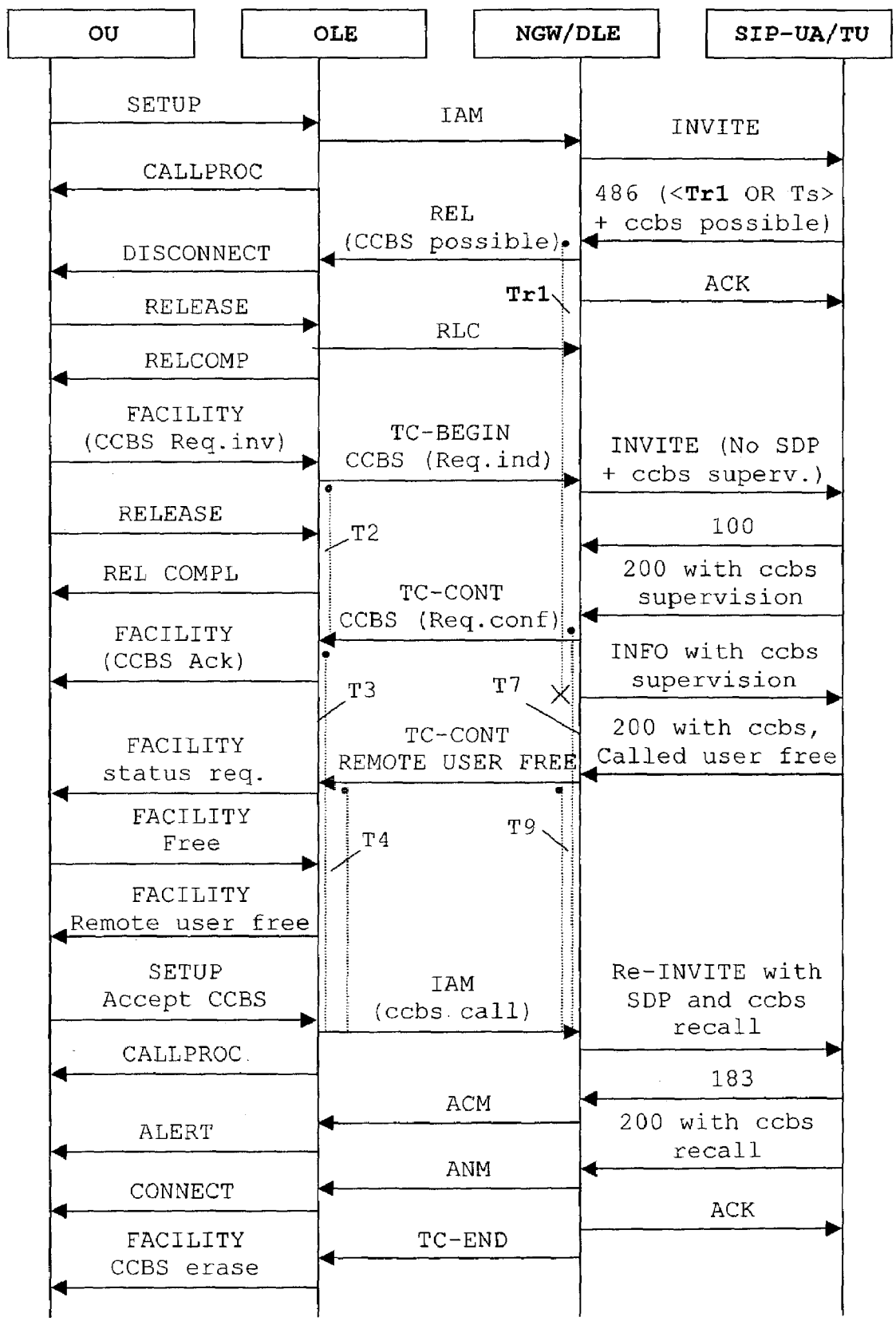
FIG.-2-

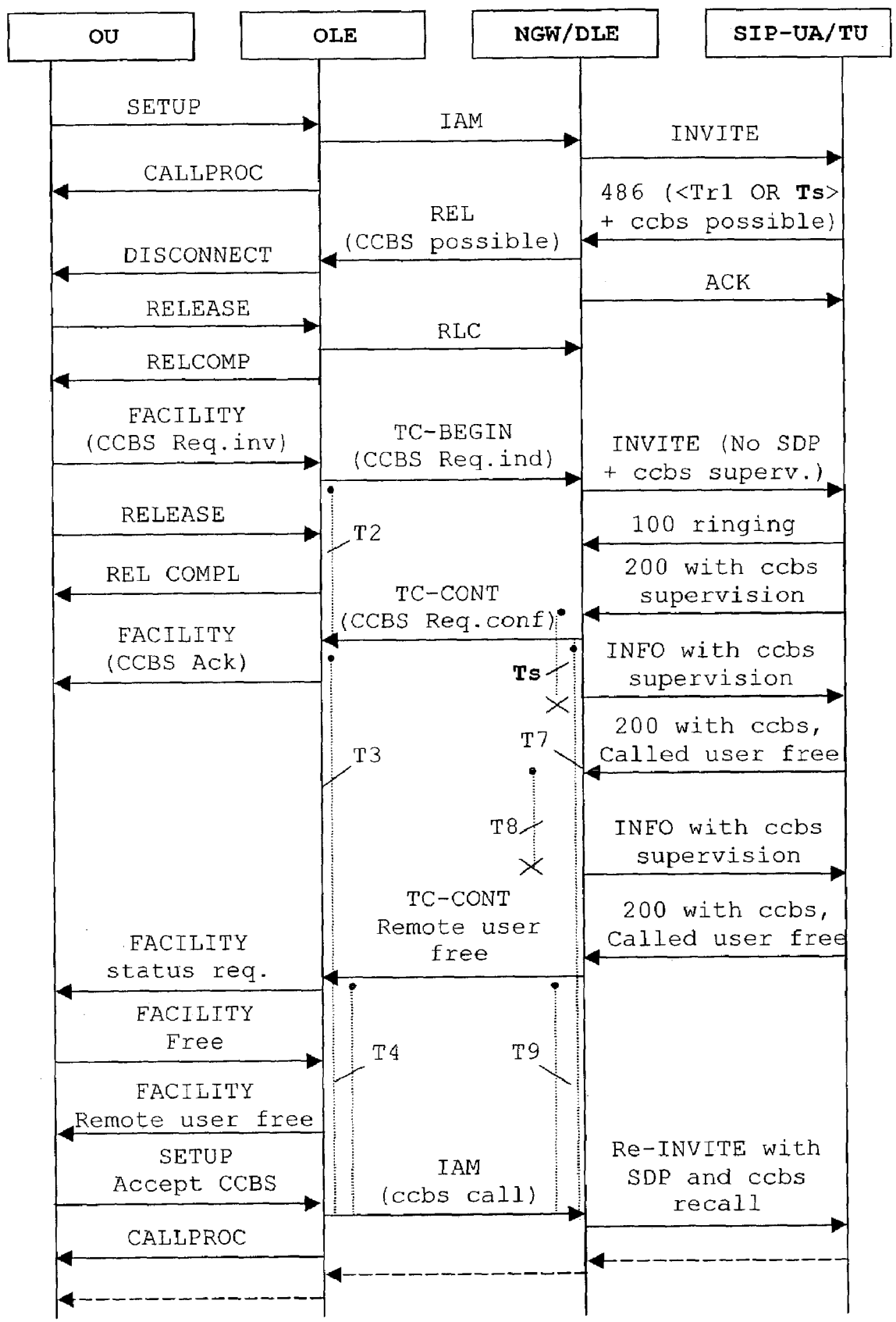
FIG.-3-

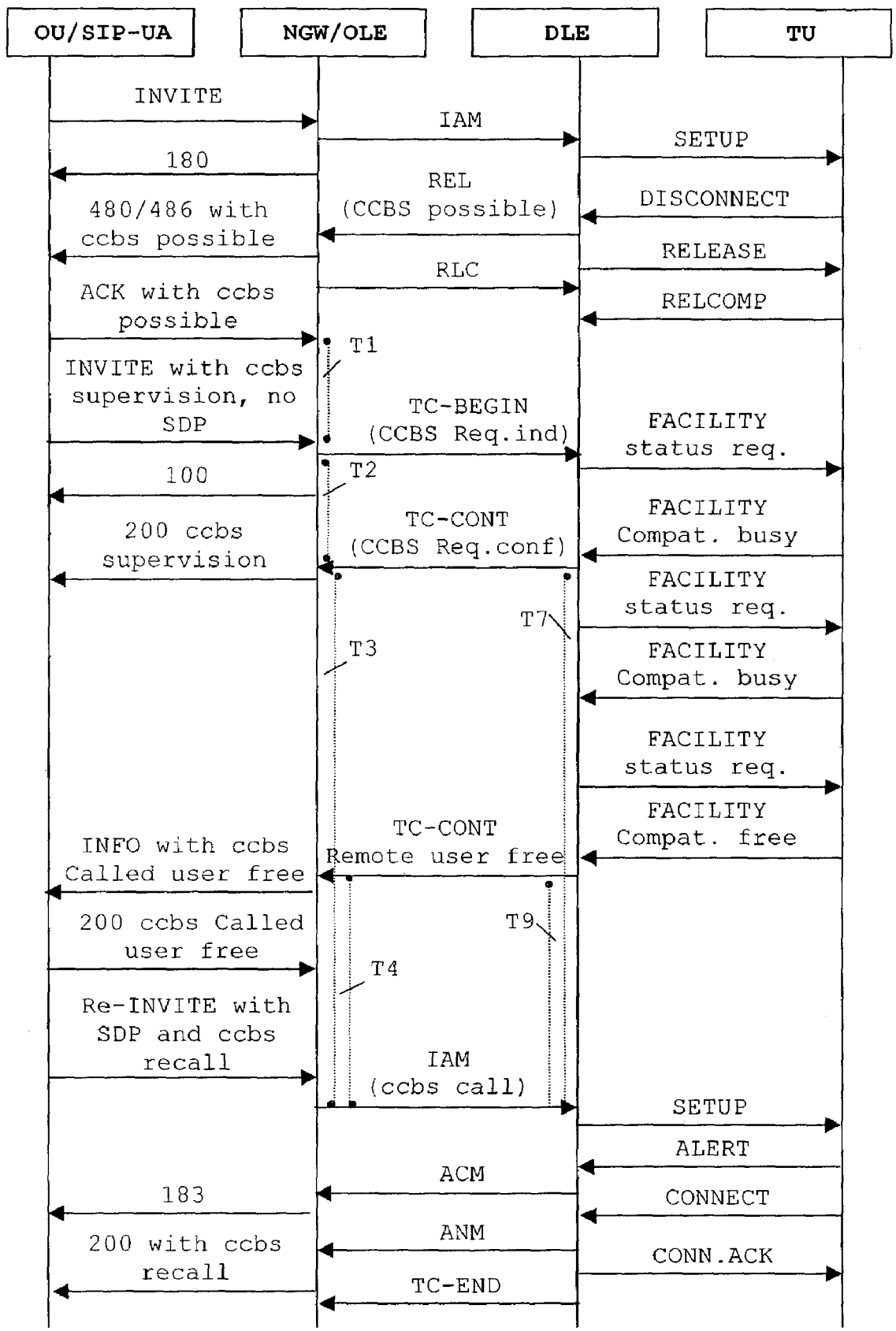
FIG.-4-

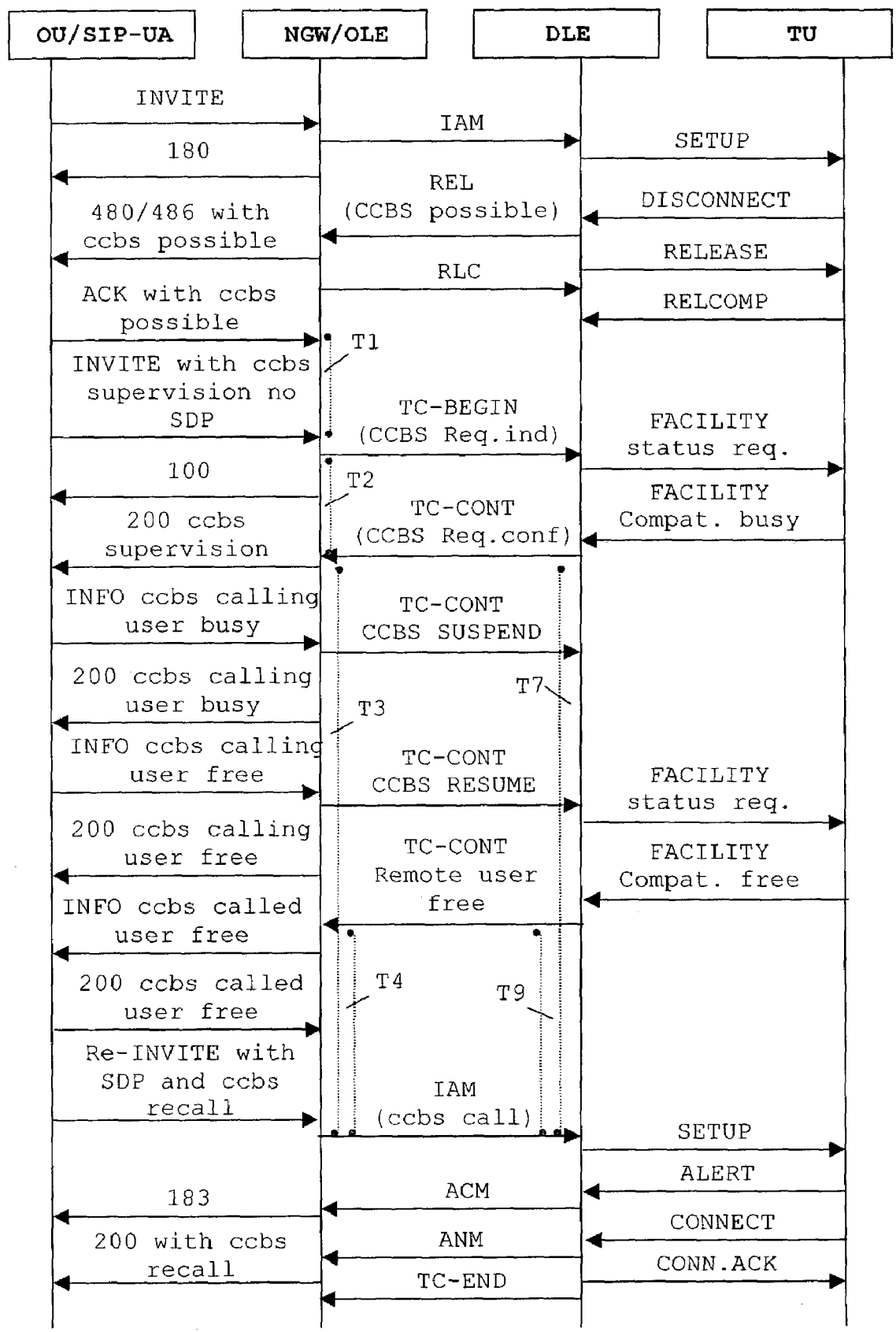
FIG.-5-

SYSTEM AND METHOD FOR CALL COMPLETION ON BUSY SUBSCRIBERS

FIELD OF THE INVENTION

The present invention generally relates to provision and support of service Call Completion on Busy Subscriber between Telephony domains and Internet domains. More specifically, the present invention relates to system and methods for supporting Call Completion on Busy Subscriber service in Internet domains inter-working with Telephony domains where said service is already supported.

BACKGROUND

There is currently a great interest world wide in providing inter-working between Telephony and Internet Protocol (IP) based networks in order to extend their respective services and advantages into the other network. One of the main reasons behind this interest resides on the higher flexibility and lower operating cost characterising the IP-based networks as transporting circuit switched network related signalling information between signalling nodes. An inter-working node acting as the border between corresponding domains, the Telephony domain and the IP domain, commonly represents such inter-working between Telephony and IP-based networks. This inter-working node is in charge of attending all the incoming requests from the IP domain as well as of sending all the traffic coming from the telephony domain to the IP domain.

One of the preferred protocols in the IP domain for call/session control is the Session Initiation Protocol (SIP), which is now under specification by the SIP Working Group of the Internet Engineering Task Forces (SIP IETF WG), within the Transport Area. In fact, several SIP entities, the so called Call Status Control Function (CSCF), have been defined in the third Generation Partnership Project (3GPP) which allow the Switched Circuit and the IP multimedia domains be interconnected.

In this respect, it is noticeable the effort in order to define protocol mapping mechanisms to make this inter-working possible between IP and Switched Circuit Networks. For example, the SIPPING Working Group within the Transport Area of the IETF defines the SIP-T framework to facilitate the interconnection of the Public Switched Telephone Network (PSTN) with the IP network. On the other hand, the Integrated Services Digital Network (ISDN) is nowadays a world wide spread network, shared by both fixed and mobile networks, wherein the ISDN User Part (ISUP) of a Signalling System #7 (SS7) is the signalling protocol that said ISDN makes use of. In this respect, the ISUP to SIP Mapping is another initiative from the SIP IETF WG, describing a way to perform the mapping between said two signalling protocols.

The current architectural proposals for this inter-working node, border between the Telephony and the IP domains, trend towards a Network Gateway (hereinafter referred to as NGW) approach, responsible for inter-working functions between Switched Circuit Networks running ISUP protocol and IP Packet Networks running SIP protocol for Call Control. Moreover, new signalling mechanisms are required in said NGW and other entities in the SIP domain to support Supplementary Services traditionally existing in the telephony domain like the aforementioned service for Call Completion on Busy Subscriber (hereinafter referred to as CCBS).

The SIP protocols or rather some of the emerging drafts in this area, like SIP Service Examples disclosed in the draft "draft-ietf-sip-service-examples-03.txt", are describing how some existing ISDN/PSTN services may be extended into the SIP world. Nevertheless, there is no teaching or consideration yet in respect of how this typical telephony service, CCBS, may enter into operation as connecting Telephony and IP domains.

RELATED ART

The CCBS supplementary service has been defined by ITU in its Recommendation Q.733.3, taking into account typical inter-working scenarios in the context of Public Networks. Said Recommendation, in this sense, is complete and stable, with all the signalling elements in place. Basically, the solution employs the Transaction Capabilities Application Part (hereinafter abbreviated as TCAP) signalling as an auxiliary transport mechanism for indications exchanged between the Originating Local Exchange in charge of the calling subscriber and the Destination Local Exchange in charge of the called subscriber. Said Originating Local Exchange (hereinafter OLE) is the exchange where the CCBS supplementary service is provided to a calling subscriber, and the Destination Local Exchange (hereinafter DLE) is the exchange serving the busy called subscriber with whom the calling subscriber is trying to talk once said called subscriber becomes idle.

In this respect, the ISUP provides also auxiliary mechanisms to indicate to the OLE and to the Calling subscriber, that a CCBS related call is possible after a first call attempt has failed due to busy conditions encountered in the DLE towards the Called subscriber. The provision also relies on the Digital subscriber Signalling System number 1 (hereinafter DSS1) protocol for those necessary indications to and from both the Calling and. Called subscribers.

In accordance with said Q.733.3 Recommendation FIG. -1a- and FIG. -1b- show the sequence of signalling events that may be carried out for invoking the CCBS service. More specifically, FIG. -1a- presents a normal call from an Originating User (OU) to a Terminating User (TU) where said TU is found to be Busy. Provided that the DLE supports the CCBS supplementary service, said DLE sets the diagnostic field of the Cause indicator parameter in the REL message to indicate whether or not CCBS is possible. For example, the DLE may answer "CCBS possible" to indicate its own availability for supporting CCBS services. When the OLE receives such REL message with a diagnostic field in the Cause parameter indicating "CCBS possible", said OLE supporting CCBS supplementary service and said supplementary service available to the OU, the OLE starts the basic call retention procedure. However, if the DLE, the OLE or the OU do not support or do not have the service available, no particular actions are made in the network.

If the OLE receives and accepts a CCBS request from the OU as presented in FIG. -1b-, OLE sends a CCBS REQUEST invoke component in a TCAP message TC-BEGIN to the DLE and starts a CCBS request timer (T2). This invoke component comprise an indication on whether or not OLE supports the retain option. The DLE receiving said CCBS REQUEST invoke component firstly stores relevant information, then performs some compatibility checks and further returns a CCBS REQUEST response confirmation to the OLE comprising an indication on whether or not DLE supports the retain option. As returning this response confirmation, DLE starts a service duration timer (T7). The DLE is monitoring the destination TU, previously busy, for said TU becoming free. Upon receipt of the CCBS request response confirmation, the OLE firstly stops the CCBS request timer (T2) and stores relevant information, then acknowledges to the OU that the service request has been accepted and starts its own service duration timer (T3). Being the CCBS service activated, the OU can originate and receive other calls as normal.

When as a result of monitoring TU status the DLE encounters that TU is not busy, a check is performed at DLE to see whether or not there are other incoming calls waiting for such TU. Provided that there is no further incoming call, DLE starts a so-called idle guard timer (T8). When said idle guard timer (T8) expires, the CCBS request is processed. To this end, DLE reserves appropriate resources and then DLE sends towards the OLE a REMOTE USER FREE invoke component included in a TCAP TC-CONT message and starts a CCBS recall timer (T9). This recall timer, where activated, is used to preclude the handling and delivery of any Initial Address Message (IAM) other than the one expected for the CCBS service on course. Upon receipt of said REMOTE USER FREE invoke component at the OLE from the DLE, the OLE recall the OU for indicating the called subscriber is now idle to receive the call, and the CCBS recall timer (T4) is started in OLE. Provided that the OU accepts the CCBS recall before said recall timer (T4) expires at OLE, the OLE stops such timer (T4) and initiates the CCBS recall by sending an IAM message comprising a CCBS call indicator and retained call information. Moreover, said TAM also comprises an ISDN user part Preference Indicator (IPI) set to "ISDN User Part required all the way". This IAM message may go through one or more Transit Exchanges (TE) until being received at the DLE. Upon receipt of said IAM at the DLE, the CCBS recall timer (T9) is stopped, and the inclusion of CCBS call indicator is checked. Provided that said indicator is included, and that resources are still reserved at DLE, the call is offered to TU with the corresponding SETUP in accordance with current protocol specification.

An interested reader can be addressed to the ITU-T Q.733.3 specifications for a more detailed explanation, including abnormal and other miscellaneous procedures CCBS related.

The solution above to implement CCBS service in classical networks has TCAP signalling as an essential feature for communication between the Originating Local Exchange (OLE) and the Destination Local Exchange (DLE) Said TCAP is in charge of managing not only the signalling required between OLE and DLE, but also managing particular operation supervision timers, and message classes in accordance with TCAP specification. However, the introduction of TCAP in IP domains, and more specifically in currently preferred protocols like the aforementioned SIP, is regarded as a quite unfeasible extension. For instance, no DSS1 capabilities exist in the SIP side either, in order to simulate such interface, and no such things as CCBS related indications exist nowadays in the SIP protocol.

At present, there is a lack of support for CCBS service in IP domains, at least in those IP domains making use of SIP signalling (hereinafter referred to as SIP domains), as interworking with Switched Circuit domains wherein CCBS is supported. Therefore, a decision must be taken as the point in the network in which the CCBS service should be provisioned and the methods to make it use in the SIP domain. Moreover, the ambition level for the extension of the service must also be considered, that is, the CCBS service shall be provided to SCN users calling SIP subscribers as well as vice versa.

In this respect, it is a main object of the present invention to offer provision and support for CCBS service for SCN users calling to SIP subscribers as well as provision and support for CCBS service for SIP users calling to SCN subscribers. It is a further object of the present invention to accomplish the main object with fewer impacts as possible in the currently proposed system architecture wherein SCN and IP domains mutually inter-work. It is a still further object of the present invention to accomplish previous objects with fewer and backward-compatible impacts in current SIP protocol specifications.

SUMMARY OF THE INVENTION

A first embodiment of the present invention accomplishes said objects by providing a telecommunications system comprising a first SIP Domain, a second Media Domain wherein multimedia sessions are signalled by a protocol operating according to a second standard, and having means for supporting CCBS service both for subscribers of the first SIP Domain calling busy subscribers of said second Media Domain and for subscribers of said second Media Domain calling busy subscribers of the first SIP Domain.

The means in this telecommunications system include for that purpose a network node that:
  handles the provision of a CCBS service for users in the first SIP Domain;
  indicates to the calling user that a CCBS service is possible when the called user is busy;
  monitors, at request from the calling user, the call status of the called used for detecting when the called used is idle to receive calls;
  indicates to the calling user that a CCBS service may be invoked being the called user idle; and
  manages the re-call from the calling user when the CCBS service is invoked towards the called user waiting for call completion.

A second embodiment of the present invention is a method, for providing a CCBS service to subscribers of a first SIP Domain receiving media calls from subscribers of a second Media Domain wherein multimedia sessions are signalled by a second protocol, comprising the steps of:
(a) finding at a network node that the called user at the SIP Domain is busy to receive new calls, and indicating to the calling user at the second Media Domain that a CCBS service is possible;
(b) monitoring from said network node the call status of the called user after the calling user having requested a CCBS service;
(c) detecting at said network node that the called user becomes idle to receive new calls, and indicating to the calling user that a CCBS service may be invoked towards the SIP Domain; and
(d) completing from said network node the re-call as invoked by the calling user towards the called user waiting for said re-call completion at the SIP Domain.

A third embodiment of the present invention is a method for providing a CCBS service to subscribers of a first SIP Domain making calls to subscribers of a second Media Domain wherein multimedia sessions are signalled by a second protocol, comprising the steps of:
(a) receiving at a network node a call from a calling user at the SIP Domain and finding at said network node that the called user at the second Media Domain is busy to receive new calls;
(b) indicating to the calling user that a CCBS service is possible at said SIP Domain;

(c) receiving at said network node a request for CCBS service from the calling user and invoking from said network node for monitoring the call status of the called user;
(d) receiving at said network node indications from the calling user at the SIP Domain about any change of call status that said calling user may suffer after having invoked the CCBS service;
(e) indicating from said network node to the calling user at the SIP Domain that a CCBS may be invoked after having detected at said network node that both calling and called user are idle to handle new calls; and
(f) receiving at said network node the re-call invoked by the calling user at the SIP Domain and completing such re-call towards the called user waiting for said re-call completion at the second Media Domain.

With regard to the nature of the second Media Domain, two basic scenarios should be considered in all the above-mentioned embodiments as included within the scope of the present invention. In a first scenario the second Media Domain is also a SIP Domain, in such a case the network node supporting the CCBS service may belong to any one of both Domains. In a second scenario, the second Media Domain is an SCN Domain and then the network node supporting the CCBS service acts as an inter-working node, namely as a gateway and, more specifically, as a Media Gateway Controller.

BRIEF DESCRIPTION OF DRAWINGS

The features, objects and advantages of the invention will become apparent by reading this description in conjunction with the accompanying drawings, in which:

FIGS. -1a- and -1b- respectively represent the flow sequence typically followed at SCN networks for a normal call encountering the called subscriber being busy and for invocation of Call Completion on Busy Subscribers service.

FIG. 2 represents a first alternative flow sequence followed at a scenario where a calling subscriber from an SCN domain invokes a Call Completion on Busy Subscriber towards a called subscriber in a SIP domain, said first alternative flow sequence starting the called subscriber supervision within a so-called retry-after period.

FIG. 3 represents a second alternative flow sequence followed at a scenario where a calling subscriber from an SCN domain invokes a Call Completion on Busy Subscriber towards a called subscriber in a SIP domain, said second alternative flow sequence starting the called subscriber supervision within a so-called time supervision period.

FIG. 4 represents a first alternative flow sequence followed at a scenario where a calling subscriber from a SIP domain invokes a Call Completion on Busy Subscriber towards a called subscriber in an SCN domain, being said calling subscriber not involved in any new call as waiting for said called subscriber becoming idle.

FIG. 5 represents a second alternative flow sequence followed at a scenario where a calling subscriber from a SIP domain invokes a Call Completion on Busy Subscriber towards a called subscriber in an SCN domain, being said calling subscriber involved in at least a new call as waiting for said called subscriber becoming idle.

DETAILED DESCRIPTION OF PREFERRED EMBODIMENTS

The following describes currently preferred embodiments of methods and system required to provide and support CCBS service for SCN users calling to SIP subscribers as well as for SIP users calling to SCN subscribers. For the sake of clarity, the embodiments can be better described on per calling and called subscriber domain basis, thus resulting in two basic scenarios. A first scenario where an SCN subscriber calls a busy SIP subscriber, and a second scenario where a SIP subscriber calls a busy SCN subscriber.

In accordance with a preferred embodiment for the first scenario above, the OLE in the SCN domain is the place where the CCBS service is provided in terms of subscription for SCN users calling SIP subscribers. In addition, an inter-working entity between SCN and SIP domains is required to provide, on the one hand, TCAP related capabilities and ISUP support for CCBS service towards the SCN domain and, on the other hand, SIP based protocol mechanisms towards the SIP domain. This inter-working entity is a Network Entity (NGW) or, more specifically, a Media Gateway Controller (MGC) connected to SIP User Agents (SIP-UA) in the SIP domain. Hereinafter a generic NGW is assumed for acting as inter-working entity between SCN and SIP domains in any scenario, or further embodiments, said NGW also representing the aforementioned MGC. Under this assumption, said NGW behaves as a DLE from an originating SCN perspective, that is, such NGW implements the normal and abnormal procedures in a DLE to and from the SCN domain, and carry out the new required SIP mechanisms and signalling time supervision toward the SIP domain.

In accordance with a preferred embodiment for the second scenario above, the provision of the CCBS service for SIP subscribers calling SCN subscribers requires that the generic NGW, or a more specific Media Gateway Controller, holds the CCBS service subscriptions for the SIP calling subscribers. This subscription to CCBS service may be dynamically achieved through the existing feature validation mechanisms of SIP specification. Under the assumption that a generic NGW acts as inter-working entity between SCN and SIP domains, said NGW behaves in this second scenario as an OLE from a destination SCN perspective. Said NGW implements the normal and abnormal procedures in an OLE towards the SCN domain, and carry out the new required SIP mechanisms and signalling time supervision toward the SIP domain. That is, such NGW provides, as for the first scenario, TCAP related capabilities and ISUP support for CCBS service towards the SCN domain, and SIP based protocol mechanisms towards the SIP domain.

The activation and invocation of the CCBS in the first scenario, where SCN user is calling to a busy SIP user, is presented in FIG. -2- accordingly with a currently preferred embodiment. In addition, FIG. -3- presents a quasi-replicated embodiment to the previous one in FIG. -2-, wherein a different time supervision approach is suggested for starting to monitor the called subscriber call status.

In light of the suggested signalling messages and sequences, those skilled in the art may easily appreciate possible particular variations and combinations thereof without substantially affecting essential features of the invention.

As presented in FIG. -2- and also in FIG. -3-, an Originating User (OU) in the SCN domain initiates a call (SETUP) towards a Terminating User (TU) in the SIP domain (hereinafter abbreviated as SIP-UA/TU). Said call is sent (IAM) from an Originating Local Exchange (OLE) at the SCN domain towards a generic NGW which is regarded as a Destination Local Exchange (DLE) from an SCN perspective (and thus hereinafter referred to as NGW/DLE in this scenario).

As a result of an unsuccessful call attempt, the SIP-UA/TU side explicitly indicates the ability to be supervised and to receive a CCBS call. This ability is indicated in a final response, like any of the existing results 480, 486, or 600, and better a specific one amongst them if deemed necessary, and including a new header.

This new header comprising the supervision period (Ts) desired by the called SIP-UA/TU. If the called SIP-UA/TU desires to also include a latency period (Tr1) for said supervision, said SIP-UA/TU indicates it with the "retry-after" header. Alternative embodiments are presented in FIG. -2- and FIG. -3- that make it use of Tr1 or Ts respectively for starting to monitor the called user call status. As following the embodiment presented in FIG. -2-, the timer Tr1 is activated as receiving it in the "retry-after" header. The value (Tr1) of the "retry-after" header should preferably not exceed 45 minutes, which is the longer time that the CCBS procedure may be typically active in the OLE (T3). In the case that the Tr1 value is exceeded, no CCBS procedure will be initiated at all. As following the embodiment shown in FIG. -3-, similar restriction applies to the supervision period indicated in the CCBS header (Ts), although a typical value of this period shall not exceed the range of 2–3 minutes. The description hereafter refers to both FIG. -2- and FIG. -3- related embodiments unless otherwise specified for particular differences.

The NGW initiates the CCBS procedure by including the "CCBS possible" indicator in the Diagnostic information field of the REL message. The process at the SCN side continues as for a normal CCBS service between SCN subscribers until sending a TC-BEGIN message to the NGW/DLE. The reception of said TC-BEGIN comprising a CCBS request indication is used to generate an INVITE message for alerting the called user (SIP-UA/TU) that a CCBS supervision session can be started from called user acceptance on. The acceptance of this supervision is indicated from the SIP-UA/TU to the NGW/DLE with a 200 response including the CCBS header set to "CCBS supervision".

Upon receipt of said 200 response, and provided that the embodiment in FIG. -3- is followed, the supervision timer Ts is activated.

Then, irrespective of following the embodiment in FIG. -2- or the one in FIG. -3-, the NGW/DLE initiates the sending of the corresponding TC-CONT including a CCBS request response confirmation towards the SCN side, always within a T2 period set at the SCN side. Besides, the NGW/DLE also starts a CCBS service duration timer (T7).

Then, depending on the embodiment followed, upon expiration of the "retry-after" timer (Tr1) for embodiment in FIG. -2-, or upon expiration of supervision timer (Ts) for embodiment in FIG. -3-, the NGW/DLE initiates the supervision requests toward the called user (SIP-UA/TU).

This supervision request to be used towards the SIP called user (SIP-UA/TU) makes it use of the INFO method in SIP with a new header to indicate "CCBS supervision". Successive INFO methods may be sent until receiving at the NGW/DLE a first 200 response to said INFO methods with a "Called user free" indication from the called user at the SIP side (SIP-UA/TU).

At this point, if a significant idle guard timer (T8) is provided at the NGW/DLE as illustrated in FIG. -3-, after expiry of said idle guard timer (T8), another supervision INFO method is issued for the last time. This idle guard timer (T8), which is particularly shown for the embodiment in FIG. -3-, could similarly be applied under the embodiment in FIG. -2- where has been omitted for the sake of clarity. Said INFO method must be answered with another 200 response with a "Called user free" indication to effectively continue the CCBS procedure.

Upon receipt of the applicable 200 response above, a CCBS recall timer (T9) is started in both embodiments shown in FIG. -2- and FIG. -3-. Then, a TC-CONT TCAP message including a REMOTE USER FREE invoke component is sent from the NGW/DLE towards the OLE at the SCN side, waiting for the corresponding IAM from the SCN. The OLE receiving such invoke component proceeds as in a pure SCN scenario, recalling the OU for indicating that the called user is now idle to receive the call, and starting the corresponding CCBS recall timer (T4) at the SCN side. For the sake of clarity just the normal procedure is described herein where the OU initiates the CCBS call before expiry of these recall timers and other timers.

Upon receipt of the SETUP message from the OU accepting the CCBS call the OLE stops the recall timer (T4) and initiates the CCBS recall by sending the corresponding IAM message comprising the "CCBS call" indicator towards the NGW/DLE.

Once the IAM is received at the NGW/DLE, the CCBS service supervision timer (T7) and the CCBS recall timer (T9) are stopped at the NGW/DLE. Then, a final re-INVITE method is issued towards the called user (SIP-UA/TU), now with the corresponding SDP information, which is the same as in the original request, and with a new header indicating "CCBS recall". As shown only in FIG. -2- though also applicable for the embodiment in FIG. -3-, the called user now is able to answer the call, acknowledges are returned back to the OU, and both users are eventually connected.

The retain options typically supported at the SCN side are also applicable as inter-working with a SIP domain in accordance with the invention. Provided that a called SIP user is busy at the time of a CCBS recall, as indicated in FIG. -2- and FIG. -3- with a re-INVITE method, and assuming that the retain option is not supported, the SIP session will be closed down immediately with the BYE method. Said BYE method likely indicating "CCBS supervision". Eventually, the TCAP resources are subsequently released. On the contrary, if the retain option is supported, the supervision session remains active, waiting for a new attempt from the OLE although the T7 were not restarted. On the other hand, T9 was stopped at reception of the IAM with recall indication and it would be restarted in the event of a similar message being received. In this case, no TCAP resource is released. At this point, it might also occur that a different supervision value is received in the latest 486 final answer, namely a Tr1 or a Ts. In this case, a similar process as the one respectively presented in top of FIG. -2- or FIG. -3- applies.

Generally speaking, the expiration of timers without having received the expected signalling from either the SCN side or from the SIP side is commonly driven to a sort of abnormal procedure. For example, the expiration of T9 implies the release of TCAP resources as well as the sending of a BYE method from the NGW/DLE to the SIP side to shut down the SIP session. Still another example is the deactivation of the CCBS service by the calling user. Said deactivation takes place by merely omitting the invocation of said service, being T7 expiring without having received the expected signalling. As in the preceding case, the TCAP resources are released as well as a BYE method is sent from the NGW/DLE to the SIP side terminating the SIP session. A similar behaviour is executed upon reception of TC-NOTICE TCAP message returned from the SCN as a response to the TC-CONT (Remote User Free) indication from the NGW. That is, instead of receiving an IAM message including the "CCBS call", as illustrated in FIG. -2- within the time gap represented by T9, the SCN may return a TC-NOTICE with an appropriate return cause. Then, the NGW/DLE would proceed to terminate the SIP session with a BYE method instead of going ahead with the re-INVITE method. As in previous cases of any timer expiration, TCAP resources are further released. Even for a BYE method sent to the SIP side, notice that the 200 responses should preferably mirror the CCBS related header of the methods they are answering.

On the other hand, the support of the CCBS service in the aforementioned second scenario, where a SIP subscriber is calling to a busy SCN subscriber, is presented in FIG. -4- accordingly with a preferred embodiment of the present invention. In this respect, and aligned with the behaviour for previous scenario, the NGW provides TCAP capabilities as well as ISUP support for CCBS towards the called SCN side.

As presented in FIG. -4- and also in FIG. -5-, an Originating User (OU) in the SIP domain (hereinafter referred to as an OU/SIP-UA) initiates a call with a SIP INVITE method towards a Terminating User (TU) in the SCN domain. This INVITE method is received at a generic NGW that is regarded as an Originating Local Exchange from an SCN perspective (and thus hereinafter referred to as NGW/OLE in this scenario). Said call is sent (IAM) from the NGW/OLE towards the Destination Local Exchange (DLE), where the called SCN subscriber is located. The DLE at the SCN side sends a SETUP message to the Terminating User (TU) and being the subscriber busy a DISCONNECT message is returned back.

As a result of an unsuccessful call attempt, and assuming that the DLE at the SCN side supports the CCBS supplementary service, said DLE sets the diagnostic field of the Cause indicator parameter in the REL message to "CCBS possible" to indicate its own availability for supporting CCBS services. When the NGW/OLE receives such REL message with a diagnostic field in the Cause parameter indicating "CCBS possible", said NGW/OLE checks whether or not the CCBS supplementary service is supported and available to the OU/SIP-UA. Provided that the service is supported and the calling user has provision of this service, the NGW/OLE indicates such ability in a final response, like any of the existing results 480, or 486, and better in a specific one between them if deemed necessary, and including a new header.

When this new header including the "CCBS possible" indicator, is received at the OU/SIP-UA, The corresponding ACK method from the SIP user shall include said CCBS header as a confirmation that CCBS supervision is requested. Once the ACK method is received at the NGW/OLE confirming the ability on the OU/SIP-UA to further invoke the CCBS service, the NGW/OLE initiates the normal retention procedures and activates the retention timer (T1). The SIP side, namely the OU/SIP-UA, must initiate a CCBS request before expiration of said retention timer (T1). To this end, an INVITE method is sent to the MGW/OLE with a "CCBS supervision" indication in the CCBS header and without any Session Description Protocol feature (SDP). Upon receipt of such INVITE method, the NGW/OLE generates a TC-BEGIN with a CCBS REQUEST invoke component indicating to the DLE to monitor the called user call status. An interesting notice to make at this point is that no ISDN specific parameters as, for instance, "userServInf", "userServInfPrime" and "accessTransport" are necessary included in the CCBS Request invoke component of the TC-BEGIN primitive, but rather and for compatibility reasons, default values can be supplied instead. In addition, NGW/OLE firstly activates the CCBS operation timer (T2), and secondly indicates the progress of the CCBS request to the OU/SIP-UA with a provisional 100 response.

The DLE receiving said CCBS REQUEST invoke component at the SCN side firstly stores relevant information, and then starts monitoring the terminating user (TU). As receiving confirmation of the SCN called user (TU) still being busy, the DLE returns a TC-CONT TCAP message with a CCBS REQUEST response confirmation to the NGW/OLE comprising an indication on whether or not DLE supports the retain option. The DLE also activates a CCBS service duration timer (T7), and monitors the destination TU, previously busy, for said TU becoming free. Upon receipt of the CCBS request response confirmation, the NGW/OLE firstly stops the CCBS operation timer (T2) and stores relevant information. Secondly, the NGW/OLE acknowledges to the OU/SIP-UA that the service request has been accepted with a 200 response including the CCBS header set to "CCBS supervision", and then activates its own service duration timer (T3). Being the CCBS service activated, the OU/SIP-UA can originate and receive other calls as normal.

In particular, the activation of the duration timer (T3) may preferably very from 15 to 45 minutes so that the supervision session must be an active session without media exchanging through. This session is of course open between the SIP user (OU/SIP-UA) and the NGW/OLE, though no switching resources are necessarily seized between said NGW/OLE and further points in the SCN domain.

At this point two different and possible situations may occur as presented in FIG. -4- and FIG. -5-. On the one hand, the calling user at the SIP side (OU/SIP-UA) may still be idle to receive and make calls, thus the OU/SIP-UA will continue on waiting for an indication of the called user (TU) becoming idle as well as presented in FIG. -4-. On the other hand, the calling user at the SIP side (OU/SIP-UA) may be encountered busy now with another call as illustrated in FIG. -5-. Provided that the OU/SIP-UA is busy upon receipt of the latest 200 response including the CCBS header set to "CCBS supervision", said OU/SIP-UA sends an INFO method with a "Calling user busy" indication towards the NGW/OLE.

According to the sequence diagram in FIG. -5-, upon receipt of said INFO method with a "Calling user busy" indication, the MGW/OLE sends another TC-CONT TCAP message to the DLE including a CCBS SUSPEND invoke component. The reception of said CCBS SUSPEND invoke indication at the DLE implies the temporary interruption of monitoring the called subscriber (TU) call status. On the other hand, after having sent the CCBS SUSPEND invoke component, the NGW/OLE starts monitoring the calling user at the SIP side (OU/SIP-UA) in order to detect when said user becomes free. To this end, NGW/OLE answer the latest INFO method, which included the "Calling user busy" indication, with a 200 response including the CCBS header set to "Calling user busy" as well. When the calling user (OU/SIP-UA) becomes idle, informs the NGW/OLE about it with a new INFO method with the CCBS header set to "Calling user free". Then, as receiving said indication of calling user in idle state and still being T3 period active, the NGW/OLE sends another TC-CONT TCAP message to the DLE including a CCBS RESUME invoke component. Upon receipt of said CCBS RESUME invoke indication, the DLE starts again monitoring the called subscriber (TU) call status until said called user becomes idle, as done in FIG. -4- where the calling user had been always idle during CCBS operation.

Upon receipt of an indication from the called user (TU) at the SCN side informing said called user (TU) is now idle to receive a CCBS call, a CCBS recall timer (T9) is started in the DLE under both embodiments shown in FIG. -4- and FIG. -5-. For the sake of simplicity, the idle guard timer (T8) in previous embodiments is omitted assuming no idle guard is used. Then, a TC-CONT TCAP message including a REMOTE USER FREE invoke component is sent from the DLE towards the NGW/OLE at the SIP side, waiting for the corresponding IAM from the SIP user (OU/SIP-UA). The NGW/OLE receiving such invoke component proceeds to recall the OU/SIP-UA for indicating that the called user is now idle to receive the call, and starting the corresponding CCBS recall timer (T4) at the SIP side. To this end, NGW/OLE sends an INFO method including a CCBS header set to "Called user free". For the sake of clarity just the normal procedure is described herein where the OU/SIP-UA initiates the CCBS call before expiry of these recall timers and other timers.

The OU/SIP-UA acknowledges the latest INFO method with a 200 response including the same header "Called user free", being able to start the CCBS recall as shown in both FIG. -4- and FIG. -5- related embodiments. Then, the calling user at the SIP side initiates the CCBS recall by issuing a re-INVITE method towards NGW/OLE, now with the corresponding SDP information and with a new header indicating "CCBS recall". Upon receipt of said re-INVITE method from the OU/SIP-UA initiating the CCBS call, the MGW/OLE stops the recall timer (T4) and initiates the CCBS recall by sending the corresponding IAM message comprising the "CCBS call" indicator towards the DLE at the SCN side.

Once the IAM is received at the DLE, the CCBS service supervision timer (T7) and the CCBS recall timer (T9) are stopped at the DLE. Then, a final SETUP message is sent towards the called user (TU) at the SCN side. The called user (TU) now is able to answer the call, acknowledges are returned back to the OU/SIP-UA, and both users are eventually connected.

There are, nevertheless, abnormal situations with subsequent abnormal procedures that may occur under this second scenario as already explained above for the first scenario. For example, as receiving a TC-CONT message with a CCBS SUSPEND invoke component in the DLE at the SCN side as a result of a calling SIP user (OU/SIP-UA) becoming busy, said DLE might return a TC-NOTICE TCAP message from the SCN towards the NGW/OLE. That is, instead of waiting for the corresponding TC-CONT with a CCBS RESUME invoke component as illustrated in FIG. -5-, within the time gap represented by T7, the SCN side may decide to terminate the CCBS service with said TC-NOTICE including an appropriate return cause. Then, the NGW/OLE would proceed to terminate the SIP session with a BYE method towards the OU/SIP-UA including a header set to "CCBS supervision". This termination must be answered from the SIP calling user (OU/SIP-UA) with a 200 response preferably including the CCBS related header, namely a "CCBS supervision".

On the other hand, provided that the SIP calling user (OU/SIP-UA) decides to drop the CCBS session, the aforementioned SIP method BYE with a "drop indication", and associated mechanisms at the SCN side are used to release the TC resources concerned. Still another deactivation of the service from the SIP calling user (OU/SIP-UA) may be carried out by simply omitting the service invocation within the CCBS recall timer (T4) period what generally leads to expiration of T3 as well. If any of these timer expirations occur, a TC-END with a CCBS CANCEL invoke component is sent from the NGW/OLE to the DLE at the SCN side to release TCAP resources, and a SIP BYE method is sent to the calling user (OU/SIP-UA) indicating "CCBS supervision". As in previous cases, this termination must be answered from the SIP calling user (OU/SIP-UA) with a 200 response preferably including the CCBS related header, namely a "CCBS supervision".

The invention claimed is:

1. A method for providing Call Completion on Busy Subscribers (CCBS) service in a telecommunications system comprising a first Media Domain which subscribers are able to receive media calls from subscribers of a second Media Domain, wherein a first subscriber of the first Media Domain is busy to receive calls from a second subscriber of the second Media Domain, comprises the steps of:
  (a) determining at a network node that the called first subscriber at the first Media Domain is busy to receive new calls, and indicating to the calling second subscriber that a CCBS is possible at said first Media Domain;
  (b) monitoring from said network node the call status of the called first subscriber at the first Media Domain after the calling second subscriber having requested a CCBS service;
  (c) detecting at said network node that the called first subscriber at the first Media Domain becomes idle to receive new calls, and indicating to the calling second subscriber that a CCBS re-call may be invoked towards said first Media Domain;
  (d) completing from said network node the CCBS re-call as invoked by the calling second subscriber towards the called first subscriber waiting for said re-call completion at said first Media Domain; and
  (e) receiving at the network node from the called first subscriber an indication of a time (Ts, Tr1) desired for starting to monitor when the called first subscriber becomes idle.

2. The method according to claim 1, wherein the step a) of determining the called first subscriber busy at the first Media Domain comprises the steps of:
  (a1) sending an INVITE SIP method towards a SIP User Agent (SIP-UA), and
  (a2) receiving an acknowledgement with indication of CCBS being possible.

3. The method according to claim 2, wherein said SIP User Agent includes a called user Terminating Unit (TU).

4. The method according to claim 1, wherein the step b) of monitoring the call status of the called first subscriber at the first Media Domain comprises the steps of:
  (b1) indicating the start of supervision to a SIP User Agent (SIP-UA) with an INVITE SIP method including a header for CCBS supervision;
  (b2) receiving as acknowledge a first response with said header for CCBS supervision;
  (b3) sending successive INFO SIP methods towards said SIP-UA until receiving indication of called first subscriber at the first Media Domain being idle to receive calls within supervision period; and
  (b4) receiving as result a second response including indication of whether or not the called first subscriber is busy for receiving new calls.

5. The method according to claim 4, wherein the step c) of detecting the called first subscriber becoming idle to receive new calls at the first Media Domain comprises the steps of:
  (c1) receiving a third response including indication of the called first subscriber being idle for new calls as the answer to a previous INFO SIP method towards said SIP-UA; and
  (c2) inviting the calling second subscriber to invoke CCBS service whilst new incoming calls not CCBS related for said called first subscriber are temporary disabled.

6. The method according to claim 1, wherein the step d) of completing the re-call as invoked from the calling second subscriber towards the called first subscriber at said first Media Domain comprises the steps of:
  (d1) receiving the re-call from the calling second subscriber side with indication referring to the expected CCBS call; and
  (d2) sending said re-call with a Re-INVITE SIP method including the received indication referring the expected CCBS call towards a SIP User Agent (SIP-UA); and
  (d3) receiving acknowledges from SIP-UA a fourth response to initiate and complete the connection towards the calling second subscriber side.

7. The method according to claim 1, wherein the network node handling the service CCBS from a calling second subscriber at a second Media Domain towards a called first subscriber at the first Media Domain is acting as a network gateway for inter-working with a second Media Domain.

8. The method according to claim 7, wherein the network node handling the service CCBS is arranged for acting as a Media Gateway Controller for exchanging multimedia signalling between said first and second Media Domains.

9. A network gateway for handling a Call Completion on Busy Subscriber service "CCBS" between a first subscriber of a first Media Domain, wherein multimedia sessions are signalled by a Session Initiation Protocol "SIP", and a second subscriber of a second Media Domain, wherein multimedia sessions are signalled by a second protocol, the network gateway comprising:
  alerting means for indicating towards a calling subscriber that a CCBS service is possible for a busy called subscriber, the alerting means including means for receiving from the busy called subscriber an indication of a time (Ts, Tr1) desired for monitoring when the busy called subscriber becomes idle;
  invocation means for monitoring when the busy called subscriber is idle to receive calls, upon a CCBS request from the calling subscriber;
  re-call means for indicating towards the calling subscriber the called subscriber is idle to receive calls;
  call set-up means for transmitting a CCBS call received from the calling subscriber towards the idle called subscriber; and
  means for holding subscriptions to CCBS services for subscribers of the first Media domain.

10. The network gateway of claim 9, wherein the invocation means includes means to initiate the monitoring of the called subscriber upon expiry of the time received by the alerting means.

11. The network gateway of claim 10, wherein the time received from the busy called subscriber indicates a supervision period (Ts) to be started upon the CCBS request from the calling subscriber.

12. The network gateway of claim 10, wherein the time received from the busy called subscriber indicates a latency period (Tr1) to be started upon indication of the supervision time received from the called subscriber.

13. The network gateway of claim 9, further comprising processing means for processing any new SIP header selected from a group of SIP headers that includes:
  a "retry-after" header for receiving an indication of supervision time for supported CCBS service from the busy called subscriber;
  a "CCBS supervision" header for indicating to the busy called subscriber the start of monitoring, and for confirming from the busy called subscriber the acceptance of being supervised;
  a "Called user free" header for indicating to the network gateway that the called subscriber is idle to receive calls; and
  a "CCBS recall" header for requesting to the network gateway the set-up of a call for which a CCBS service was invoked.

14. The network gateway of claim 9, wherein the alerting means further comprises checking means to verify whether the calling subscriber of the first Media Domain has a subscription provisioned to CCBS service.

* * * * *

UNITED STATES PATENT AND TRADEMARK OFFICE
CERTIFICATE OF CORRECTION

PATENT NO. : 7,149,299 B2  
APPLICATION NO. : 10/316576  
DATED : December 12, 2006  
INVENTOR(S) : Manuel Cardeno Triano et al.

Page 1 of 1

It is certified that error appears in the above-identified patent and that said Letters Patent is hereby corrected as shown below:

On the Face Page, in Field (56), under "OTHER PUBLICATIONS", in Column 2, Line 3, delete "19999," and insert -- 1999, --, therefor.

In Column 2, Line 1, delete "protocols" and insert -- protocol, --, therefor.

In Column 2, Line 36, delete "and." and insert -- and --, therefor.

In Column 3, Line 29, delete "TAM" and insert -- IAM --, therefor.

In Column 3, Line 46, delete "(DLE)" and insert -- (DLE). --, therefor.

Signed and Sealed this

Tenth Day of June, 2008

JON W. DUDAS  
*Director of the United States Patent and Trademark Office*